US008436053B2

(12) United States Patent  (10) Patent No.: US 8,436,053 B2
Leffew et al.  (45) Date of Patent: *May 7, 2013

(54) FLUORINATED IONOMER PRODUCED BY AQUEOUS POLYMERIZATION USING DISPERSED PARTICULATE OF FLUORINATED IONOMER

(75) Inventors: Kenneth Wayne Leffew, Kennett Square, PA (US); Ralph Birchard Lloyd, Fayetteville, NC (US); Charles Joseph Noelke, Pinehurst, NC (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 465 days.

This patent is subject to a terminal disclaimer.

(21) Appl. No.: 12/641,386

(22) Filed: Dec. 18, 2009

(65) Prior Publication Data

US 2011/0152387 A1   Jun. 23, 2011

Related U.S. Application Data

(60) Provisional application No. 61/140,119, filed on Dec. 23, 2008.

(51) Int. Cl.
*C08F 2/16* (2006.01)

(52) U.S. Cl.
USPC ............ 521/25; 526/131; 526/201; 526/203; 526/242; 526/243

(58) Field of Classification Search .................... 521/25; 526/131, 201, 203, 242, 243
See application file for complete search history.

(56) References Cited

U.S. PATENT DOCUMENTS

| 2,559,752 | A | 7/1951 | Berry |
| 2,713,593 | A | 7/1955 | Brice et al. |
| 3,037,953 | A | 6/1962 | Marks et al. |
| 3,271,341 | A | 9/1966 | Garrison, Jr. et al. |
| 3,282,875 | A | 11/1966 | Connolly et al. |
| 3,291,843 | A | 12/1966 | Fritz et al. |
| 3,391,099 | A | 7/1968 | Punderson |
| 3,704,272 | A | 11/1972 | Holmes |
| 4,358,545 | A | 11/1982 | Ezzell et al. |
| 4,380,618 | A | 4/1983 | Khan et al. |
| 4,443,082 | A | 4/1984 | Murano et al. |
| 4,552,631 | A | 11/1985 | Bissot et al. |
| 4,621,116 | A | 11/1986 | Morgan |
| 4,743,658 | A | 5/1988 | Imbalzano et al. |
| 4,940,525 | A | 7/1990 | Ezzell et al. |
| 4,952,630 | A | 8/1990 | Morgan et al. |
| 5,422,411 | A | 6/1995 | Wei et al. |
| 5,637,748 | A | 6/1997 | Hung et al. |
| 5,688,884 | A | 11/1997 | Baker et al. |
| 5,763,552 | A | 6/1998 | Feiring et al. |
| 5,789,508 | A | 8/1998 | Baker et al. |
| 5,925,705 | A | 7/1999 | Araki et al. |
| 6,153,688 | A | 11/2000 | Miura et al. |
| 6,177,196 | B1 | 1/2001 | Brothers et al. |
| 6,274,677 | B1 | 8/2001 | Tatemoto |
| 6,300,445 | B1 | 10/2001 | Hung et al. |
| 6,395,848 | B1 | 5/2002 | Morgan et al. |
| 6,552,093 | B1 | 4/2003 | Curtin et al. |
| 6,841,616 | B2 | 1/2005 | Wille et al. |
| 7,071,271 | B2 | 7/2006 | Thaler et al. |
| 7,166,685 | B2 | 1/2007 | Curtin et al. |
| 2003/0023015 | A1 | 1/2003 | Tatemoto et al. |
| 2003/0191258 | A1 | 10/2003 | Tan et al. |
| 2003/0195314 | A1 | 10/2003 | Buckanin et al. |
| 2003/0224235 | A1 | 12/2003 | Park et al. |
| 2005/0043487 | A1 | 2/2005 | Felix et al. |
| 2005/0090613 | A1 | 4/2005 | Maruya et al. |
| 2005/0096442 | A1 | 5/2005 | Thaler et al. |
| 2005/0119357 | A1 | 6/2005 | Curtin et al. |
| 2006/0014887 | A1 | 1/2006 | Hamrock et al. |
| 2006/0128872 | A1 | 6/2006 | Zipplies et al. |
| 2006/0160947 | A1 | 7/2006 | Tan et al. |
| 2006/0241261 | A1* | 10/2006 | Wu et al. .................. 526/247 |
| 2006/0281946 | A1 | 12/2006 | Morita et al. |
| 2007/0004848 | A1 | 1/2007 | Hintzer et al. |
| 2007/0015864 | A1 | 1/2007 | Hintzer et al. |
| 2007/0015865 | A1 | 1/2007 | Hintzer et al. |
| 2007/0015866 | A1 | 1/2007 | Hintzer et al. |
| 2007/0208131 | A1 | 9/2007 | Tsuda et al. |

FOREIGN PATENT DOCUMENTS

| EP | 0148482 B1 | 3/1992 |
| EP | 1 283 225 B1 | 5/2006 |
| GB | 1292268 | 10/1972 |
| JP | 200475978 A | 3/2004 |
| JP | 2004075978 | 3/2004 |
| JP | 2004358397 A | 12/2004 |

(Continued)

OTHER PUBLICATIONS

Apostolo et al., "Properties of Fluoroelastomer/Semicrystalline Perfluoropolymer Nano-Blends", Journal of Fluorine Chemistry, vol. 125, pp. 303-314 (2004).*

(Continued)

*Primary Examiner* — Peter D. Mulcahy
*Assistant Examiner* — Henry Hu

(57) ABSTRACT

A process for making an aqueous dispersion of fluorinated ionomer particles by providing dispersed particulate of fluorinated ionomer in an aqueous polymerization medium and polymerizing at least one fluorinated monomer having an ionic group in the aqueous polymerization medium in the presence of the dispersed particulate of fluorinated ionomer and initiator to form the aqueous dispersion of particles of fluorinated ionomer.

22 Claims, No Drawings

FOREIGN PATENT DOCUMENTS

| | | | |
|---|---|---|---|
| JP | 2004359870 A | | 12/2004 |
| WO | 0146116 A1 | | 6/2001 |
| WO | 02/095121 A1 | | 11/2002 |
| WO | 03059992 A1 | | 7/2003 |
| WO | 2004067588 A1 | | 8/2004 |
| WO | WO-2006/135825 A1 | * | 12/2006 |
| WO | WO 2006/135825 A1 | | 12/2006 |
| WO | 2007046345 A1 | | 4/2007 |
| WO | 2007046377 A1 | | 4/2007 |
| WO | 2007046482 A1 | | 4/2007 |
| WO | 2007049517 A1 | | 5/2007 |
| WO | 2008060463 A1 | | 5/2008 |
| WO | WO-2008/060463 A1 | * | 5/2008 |
| WO | 2009094344 A1 | | 7/2009 |

OTHER PUBLICATIONS

Baekelmans, Didier, Authorized Officer, International Search Report, PCT/US2009/069370, dated Apr. 9, 2010.

Apostolo, Marco et al, "Properties of Fluoroelastomer/Semicrystalline Perfluoropolymer Nano-Blends", Journal of Fluorine Chemistry, 125 (2004) 303-314.

* cited by examiner

US 8,436,053 B2

FLUORINATED IONOMER PRODUCED BY AQUEOUS POLYMERIZATION USING DISPERSED PARTICULATE OF FLUORINATED IONOMER

FIELD OF THE INVENTION

This invention relates to a process for the dispersion polymerization of fluorinated monomer having an ionic group in an aqueous polymerization medium and fluorinated ionomer particles and aqueous dispersions made thereby.

BACKGROUND OF THE INVENTION

Fluorinated ionomers are used commercially in the manufacture of ion exchange membranes for electrochemical applications. One industrial application is the chloralkali process for the electrolysis of sodium chloride to produce sodium hydroxide and chlorine. Polymer electrolyte membrane (PEM) fuel cells typically employ fluorinated ionomer membranes. Fluorinated ionomer is also useful as a solid acid catalyst for various chemical processes.

Most known processes for the polymerization of fluorinated ionomer copolymerize tetrafluoroethylene with a fluorinated vinyl ether monomer having sulfonyl fluoride group such as is disclosed in U.S. Pat. Nos. 3,282,875, 4,940,525 and 7,071,271. The process of U.S. Pat. No. 3,282,875 teaches that it is preferred to carry out polymerization in a perfluorocarbon solvent. U.S. Pat. No. 4,940,525 teaches an aqueous polymerization process using the ammonium salt of perfluorooctanoic acid as a fluorosurfactant. U.S. Pat. No. 7,071,271 teaches a process which employs the step of making a pre-emulsion of the $SO_2F$-comonomer using a microfluidizer prior to the start of the polymerization process. The pre-emulsion, however, is not stable over time, i.e., has a "pot life" of at least 1 hour.

Moreover, the copolymerization of tetrafluoroethylene with a fluorinated vinyl ether monomer with a sulfonyl fluoride group does not produce an ionomer directly and instead produce a fluorinated ionomer precursor. Although the sulfonyl fluoride precursor is useful for fabrication of articles such as membranes by melt processing, the fluorinated ionomer precursor must be subjected to a subsequent process step to hydrolyze the sulfonyl fluoride groups of the polymer sulfonate groups to form the ionomer. When ionomer is desired in sulfonic acid form, the ionomer must be further treated to convert it to acid form.

A process is desired for the manufacture of fluorinated ionomer which directly produces fluorinated ionomer, especially as a dispersion of fluorinated ionomer particles in an aqueous medium.

SUMMARY OF THE INVENTION

The invention is based on the discovery that a process for making an aqueous dispersion of fluorinated ionomer particles is effectively carried out by providing dispersed particulate of fluorinated ionomer in an aqueous polymerization medium and polymerizing at least one fluorinated monomer having an ionic group in the aqueous polymerization medium in the presence of the dispersed particulate of fluorinated ionomer and initiator to form the aqueous dispersion of particles of fluorinated ionomer.

In one preferred form of the present invention, the amount of the dispersed particulate of fluorinated ionomer provided in said aqueous polymerization medium comprises less than about 15 wt % of said fluorinated ionomer solids produced in said aqueous dispersion. In another preferred form of the invention, the dispersed particulate of fluorinated ionomer has a weight average particle size of about 2 nm to about 100 nm. The fluorinated ionomer preferably has an ion exchange ratio of about 3 to about 53. In a preferred embodiment of the invention, the fluorinated ionomer is highly fluorinated, more preferably, perfluorinated.

In a preferred form of the invention, the process further comprises providing surfactant in said polymerization medium. Preferably, the surfactant comprises fluorosurfactant, more preferably, fluoroether surfactant.

DETAILED DESCRIPTION OF THE INVENTION

Fluorinated Ionomer Particulate

Particulate of fluorinated ionomer is employed in the process in accordance with the present invention. "Fluorinated Ionomer" means a fluoropolymer having sufficient ionic groups to provide an ion exchange ratio of no greater than about 53. In this application, "ion exchange ratio" or "IXR" is defined as number of carbon atoms in the polymer backbone in relation to the ionic groups. Precursor groups such as $-SO_2F$ which upon hydrolysis become ionic are not treated as ionic groups for the purposes of determining IXR. The fluorinated ionomer employed in the process of the invention preferably has an ion exchange ratio of about 3 to about 53. More preferably, the IXR is about 3 to about 43, even more preferably about 3 to about 33, still more preferably about 8 to about 33, most preferably 8 to about 23. In a preferred embodiment, the fluorinated ionomer is highly fluorinated. "Highly fluorinated" in reference to ionomer means that at least 90% of the total number of univalent atoms bonded to carbon atoms in the polymer are fluorine atoms. Most preferably, the ionomer is perfluorinated.

In fluorinated ionomers, the ionic groups are typically distributed along the polymer backbone. Preferably, the fluorinated ionomer comprises a polymer backbone with recurring side chains attached to the backbone with the side chains carrying the ionic groups. Preferred fluorinated ionomer comprises ionic groups having a pKa less than about 10, more preferably, less than about 7. Ionic groups of the polymer are preferably selected from the group consisting of sulfonate, carboxylate, phosphonate, phosphate, and mixtures thereof. The terms "sulfonate, carboxylate, phosphonate and phosphate" are intended to refer to either the respective salts or respective acids from which salts can be formed. Preferably, when salts are employed, the salts are alkali metal or ammonium salts. Preferred ionic groups are sulfonate groups. Sulfonate groups in preferred fluorinated ionomers used in the process of the invention have a pKa of about 1.9 as measured on the fluorinated ionomer in aqueous dispersion form having 10 wt % solids at room temperature.

Various known fluorinated ionomers can be used including polymers and copolymers of trifluoroethylene, tetrafluoroethylene (TFE), $\alpha,\beta,\beta$-trifluorostyrene, etc., into which ionic groups have been introduced. $\alpha,\beta,\beta$-trifluorostyrene polymers useful for the practice of the invention are disclosed in U.S. Pat. No. 5,422,411. Possible polymers include homopolymers or copolymers of two or more monomers. Copolymers are typically formed from one monomer which is a nonfunctional monomer and which provides carbon atoms for the polymer backbone. A second monomer provides both carbon atoms for the polymer backbone and also contributes the side chain carrying the ionic group or its precursor, e.g., a sulfonyl fluoride group ($-SO_2F$), which can be subsequently hydrolyzed to a sulfonate functional group. For example, copolymers of a first fluorinated vinyl monomer together with a second fluorinated vinyl monomer having a sulfonyl fluoride group (—SO$_2$F) can be used. Possible first monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof. Possible second monomers include a variety of fluorinated vinyl ethers with ionic groups or precursor groups which can provide the desired side chain in the polymer. The first monomer may also have a side chain. Additional monomers can also be incorporated into these polymers if desired.

A class of preferred ionomers for use in the present invention includes a highly fluorinated, most preferably perfluorinated, carbon backbone and the side chain is represented by the formula

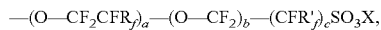

—(O—CF$_2$CFR$_f$)$_a$—(O—CF$_2$)$_b$—(CFR'$_f$)$_c$SO$_3$X, wherein R$_f$ and R'$_f$ are independently selected from F, Cl or a perfluorinated alkyl group having 1 to 10 carbon atoms, a=0 to 2, b=0 to 1, c=0 to 6, and X is H, Li, Na, K or NH$_4$. The preferred ionomers include, for example, polymers disclosed in U.S. Pat. No. 3,282,875 and in U.S. Pat. Nos. 4,358,545 and 4,940,525. One preferred ionomer comprises a perfluorocarbon backbone and the side chain is represented by the formula —O—CF$_2$CF(CF$_3$)—O—CF$_2$CF$_2$SO$_3$X, wherein X is as defined above. Ionomers of this type are disclosed in U.S. Pat. No. 3,282,875 and can be made by copolymerization of tetrafluoroethylene (TFE) and the perfluorinated vinyl ether CF$_2$=CF—O—CF$_2$CF(CF$_3$)—O—CF$_2$CF$_2$SO$_2$F, perfluoro (3,6-dioxa-4-methyl-7-octenesulfonyl fluoride) (PDMOF), followed by conversion to sulfonate groups by hydrolysis of the sulfonyl fluoride groups and ion exchanging if needed to convert to the desired form. One preferred ionomer of the type disclosed in U.S. Pat. Nos. 4,358,545 and 4,940,525 has the side chain —O—CF$_2$CF$_2$SO$_3$X, wherein X is as defined above. This ionomer can be made by copolymerization of tetrafluoroethylene (TFE) and the perfluorinated vinyl ether CF$_2$=CF—O—CF$_2$CF$_2$SO$_2$F, perfluoro(3-oxa-4-pentenesulfonyl fluoride) (POPF), followed by hydrolysis and acid exchange if needed.

For ionomers of this type, the cation exchange capacity of a polymer is often expressed in terms of equivalent weight (EW). For the purposes of this application, equivalent weight (EW) is defined to be the weight of the ionomer in acid form required to neutralize one equivalent of NaOH. In the case of a sulfonate ionomer where the ionomer comprises a perfluorocarbon backbone and the side chain is —O—CF$_2$—CF (CF$_3$)—O—CF$_2$—CF$_2$—SO$_3$H (or a salt thereof), the equivalent weight range which corresponds to an IXR of about 8 to about 23 is about 750 EW to about 1500 EW. IXR for this ionomer can be related to equivalent weight using the following formula: 50 IXR+344=EW. While generally the same IXR range is used for sulfonate ionomers disclosed in U.S. Pat. Nos. 4,358,545 and 4,940,525, e.g., the ionomer having the side chain —O—CF$_2$CF$_2$SO$_3$H (or a salt thereof), the equivalent weight is somewhat lower because of the lower molecular weight of the monomer unit containing the ionic group. For the preferred IXR range of about 8 to about 23, the corresponding equivalent weight range is about 575 EW to about 1325 EW. IXR for this polymer can be related to equivalent weight using the following formula: 50 IXR+178=EW.

The molecular weight of the fluorinated ionomer particulate can generally be in the same range as the resin which is used in ion exchange polymer membranes used in the chloralkali process for the electrolytic production of chlorine and sodium hydroxide from sodium chloride and in fuel cells. Such fluorinated ionomer resin has a molecular weight which preferably provides solid fluorinated ionomer particulate at room temperature. In thermoplastic forms of the fluorinated ionomer, melt flow rate is preferably in the range of 1 to about 500, more preferably about 5 to about 50, most preferably about 10 to about 35 g/10 min.

The fluorinated ionomer particulate of the dispersion employed in accordance with the process of the invention preferably has a weight average particle size of about 2 nm to about 100 nm. More preferably, such particulate has a weight average particle size of about 2 to about 50 nm, even more preferably about 2 to about 30, still more preferably about 2 to about 10 nm. A suitable preparation method for aqueous dispersions of such fluorinated ionomer particulate is taught in U.S. Pat. Nos. 6,552,093 and 7,166,685 (Curtin et al.). The preparation method of Curtin et al. can provide "water only" aqueous dispersions. "Water only" means the aqueous dispersions contain a liquid medium which contains either no other liquids other than water or, if other liquids are present, no more that about 1 wt %, of such liquids.

The weight average particle size in a liquid dispersion of fluorinated ionomer particulate used in accordance with the invention can be measured by a dynamic light scattering (DLS) technique as described below in the Test Methods.

In accordance with the invention, dispersed fluorinated ionomer particulate is preferably provided in the aqueous polymerization medium by mixing a concentrated aqueous dispersion or dispersible powder of the fluorinated ionomer into the aqueous polymerization medium. Preferred concentrated aqueous dispersions for use in accordance with the invention are preferably the "water only" aqueous dispersions described about made as taught in U.S. Pat. Nos. 6,552,093 and 7,166,685 (Curtin et al.). Solids levels in such concentrates are preferably about 1 to about 35 wt %, more preferably about 5 to about 35 wt %. Aqueous dispersions made as disclosed in U.S. Pat. Nos. 6,552,093 and 7,166,685 B2 (Curtin et al.) can also be dried to form powders which are readily redispersed in water or various polar organic solvents to provide dispersions in such solvents. While dispersions of fluorinated ionomer particulate in polar organic solvents may be useful in the practice of the invention, such solvents are usually telogenic and it is generally preferred to employ aqueous dispersions of the fluorinated ionomer in the practice of the present invention with low amounts or no organic solvents present. Thus, dried powders of the dispersions made according to U.S. Pat. Nos. 6,552,093 and 7,166,685 B2 (Curtin et al.) can be introduced directly into the aqueous polymerization medium or mixed with water to produce a concentrated aqueous dispersion prior to such introduction to provide the dispersion of fluorinated ionomer particulate. Concentrated aqueous dispersions, whether made directly from the process as disclosed in U.S. Pat. Nos. 6,552,093 and 7,166,685 B2 (Curtin et al.) or made from dried powders, can be produced and stored at concentrations up to 35 wt % solids, are stable for long periods, and can be diluted to any desired concentration with water.

Suitable fluorinated ionomer dispersions may also be available in, for example, mixed solvents of water and lower alcohols as disclosed in U.S. Pat. No. 4,443,082 (Grot). The alcohol content of such dispersions may be reduced or substantially removed using, for example, a rotary evaporator.

Fluorinated Ionomer Particles Produced in the Process

The fluorinated ionomer of the fluorinated ionomer particles produced by the process of the invention can be of the same type as described above for the fluorinated ionomer of the fluorinated ionomer particulate except that the fluorinated ionomer is produced directly due to the fluorinated monomer being employed with the ionic group in ionic form during polymerization, i.e., as the acid or salt. The type of monomers employed, the types ionic groups, whether in the ionic groups are in acid or salt form, IXR, melt flow, dispersion concentration, weight average particle size and other properties are selected based on the desired end use properties and the selected conditions employed in the polymerization process of the invention employed as will be described in more detail hereinafter.

Surfactant

In addition to a dispersion of fluorinated ionomer particulate, the aqueous polymerization medium used to form the aqueous dispersion of particles of fluoropolymers may further comprise surfactant. The surfactant can be selected from a large group of suitable surfactants including hydrocarbon surfactants, siloxane surfactants, and fluorosurfactants. Suitable hydrocarbon surfactants have been disclosed in U.S. Pat. No. 5,925,705 to Araki et al; and JP Patent Publications 2004/358397 and 2004/359870 to Tsuda et al. Suitable siloxane surfactants have been described in U.S. Pat. No. 6,841,616 to Wille et al. Preferably the surfactant is a fluorosurfactant and more preferably is a fluoroether surfactant.

Examples of fluorosurfactants that may be a component of the polymerization agent are described in U.S. Pat. No. 6,395,848 to Morgan et al. as fluoroalkyl having at most one ether oxygen, preferably perfluoroalkyl, carboxylic acids and salts thereof having 6-20 carbon atoms, preferably 6-12 carbon atoms, such as ammonium perfluorooctanoate and ammonium perfluorononanoate (see Berry, U.S. Pat. No. 2,559,752). Perfluoroalkyl sulfonic acids and salt may also be used. In a preferred embodiment of the invention, perfluoroalkyl ethane sulfonic acids and salts thereof are employed, preferably a compound or a mixture of compounds of the formula F—(—CF$_2$—CF$_2$—)$_n$—CH$_2$CH$_2$—SO$_3$M, wherein n is 2-8 and M is a cation having a valence of 1 as described in Khan & Morgan, U.S. Pat. No. 4,380,618. More preferably, such perfluoroalkyl ethane sulfonic acid surfactant comprises a compound of the formula C$_6$F$_{13}$—CH$_2$CH$_2$—SO$_3$M, wherein M is a cation having a valence of 1 as described in Baker & Zipfel, U.S. Pat. Nos. 5,688,884 and 5,789,508. Preferably, M in the above formula is NH$_4^+$.

Additional examples of such fluorosurfactants include perfluoroalkoxy benzene sulfonic acids and salts thereof wherein the perfluoroalkyl component of the perfluoroalkoxy has 4-12 carbon atoms, preferably 7-12 carbon atoms (as described in Morgan, U.S. Pat. No. 4,621,116). Additional examples of such surfactants also include partially-fluorinated surfactants having internal methylene groups and having the formula R$_f$—(CH$_2$)$_m$—R'$_f$—COOM wherein m is 1-3, R$_f$ is perfluoroalkyl or perfluoroalkoxy containing 3-8 carbon atoms, R'$_f$ is linear or branched perfluoroalkylene containing 1-4 carbon atoms, and M is NH$_4$, Li, Na, K, or H (as described in Feiring et al., U.S. Pat. No. 5,763,552).

Examples of suitable fluoroether surfactants have been described in U.S. Pat. No. 3,271,341 to Garrison; U.S. Patent Publications 2007/0015864, 2007/0015865, and 2007/0015866 to Hintzer et al.; U.S. Patent Publications 2005/0090613 to Maruya et al. and 2006/0281946 to Morita et al.; PCT Patent Publications WO 2007046345 to Higuchi et al., 2007046377 to Funaki et al., 2007046482 to Hoshikawa et al., and 2007/049517 to Matsuoka et al.

In accordance with a preferred embodiment of the invention, the aqueous medium comprises less than about 300 ppm of perfluoroalkane carboxylic acid or salt fluorosurfactants having 8 or more carbon atoms, based on the weight of water in the aqueous medium. Perfluoroalkane acid or salt fluorosurfactants having 8 or more carbon atoms include such surfactants having for example 8-14 carbon atoms, e.g., perfluorooctanoic acid and salts and perfluorononanoic acid and salts. More preferably, the aqueous medium comprises less than about 100 ppm of perfluoroalkane carboxylic acid or salt fluorosurfactants having 8 or more carbon atoms, more preferably less than 50 ppm. In a preferred embodiment of the invention, the aqueous medium is substantially free of perfluoroalkane carboxylic acid or salt fluorosurfactants having 8 or more carbon atoms. Substantially free of perfluoroalkane carboxylic acid or salt fluorosurfactants having 8 or more carbon atoms means that aqueous medium contains no more than about 10 ppm of such fluorosurfactants.

In a preferred embodiment the aqueous polymerization medium contains a short chain fluorosurfactant having the formula:

$$[R^1—O_n\text{-L-A}^-]Y^+ \quad (I)$$

wherein:

R$^1$ is a linear or branched partially or fully fluorinated aliphatic group which may contain ether linkages;

n is 0 or 1;

L is a linear or branched alkylene group which may be nonfluorinated, partially fluorinated or fully fluorinated and which may contain ether linkages;

A$^-$ is an anionic group selected from the group consisting of carboxylate, sulfonate, sulfonamide anion, and phosphonate; and Y$^+$ is hydrogen, ammonium or alkali metal cation;

with the proviso that the chain length of R$^1$—O$_n$-L- is not greater than 6 atoms.

"Chain length" as used in this application refers to the number of atoms in the longest linear chain in the hydrophobic tail of the fluorosurfactant employed in the process of this invention. Chain length includes atoms such as oxygen atoms in addition to carbon in the chain of the hydrophobic tail of the surfactant but does not include branches off of the longest linear chain or include atoms of the anionic group, e.g., does not include the carbon in carboxylate. "Short chain" as used in this application refers to a chain length of not greater than 6. "Long chain" refers to a chain length of greater than 6, e.g., fluorosurfactants having a chain length of 7 to 14 atoms.

Preferably, the chain length of R$^1$—O$_n$-L- is 3 to 6 atoms. In accordance with one preferred form of the invention the chain length of R$^1$—O$_n$-L- is 4 to 6 atoms. In accordance with another preferred form of the invention the chain length of R$^1$—O$_n$-L- is 3 to 5 atoms. Most preferably, the chain length of R$^1$—O$_n$-L- is 4 to 5 atoms. A preferred class of fluorosurfactants is short chain fluoroether acids or salts, i.e., wherein n is 1 in Formula (I) above. Preferred fluoroether acids or salts in accordance with the invention are fluorosurfactants according to Formula (I) wherein:

R$^1$ is a linear or branched partially or fully fluorinated alkyl group having 1 to 3 carbon atoms which may contain ether linkages; and L is an alkylene group selected from —CX(R$^2$)—, wherein R$^2$ is fluorine or perfluoromethyl and X is hydrogen or fluorine, and —CZ$^1$Z$^2$CZ$^3$Z$^4$—, wherein Z$^1$, Z$^2$, Z$^3$, and Z$^4$ are independently selected from hydrogen or fluorine.

Fluoroether acids and salts of this type are known. When L is an alkylene group selected from —CX(R$^2$)—, wherein R$^2$ is fluorine or perfluoromethyl and X is hydrogen or fluorine, the compound can be made, for example, by hydrolysis of perfluoro-2-alkoxypropionyl fluoride intermediates prepared by reacting alkanoic acid fluorides with hexafluoropropylene oxide as disclosed in U.S. Pat. No. 3,291,843 to Fritz and Selman for use in perfluoro(alkyl vinyl ether) manufacture. When L is —CZ$_2$CZ$_2$—, wherein Z is independently selected from hydrogen or fluorine, routes to making such compounds are generally described In U.S. Pat. No. 2,713,593 (Brice et al.) where fluoro(alkoxypropionic) acids and derivatives are obtained in useful yields from corresponding hydrocarbon alkoxypropionic acids and derivatives by electrochemical fluorination. Fully fluorinated and partially fluorinated products can be separated for example by fractional distillation. Useful teachings for synthesis can also be found in EP 0 148 482 B1 (Ohsaka et al.) for partially fluorinated propoxy propionic acid fluoride which may be further fluorinated or perfluorinated by electrofluorinating the acid fluoride which is then easily converted to an acid or salt.

In accordance with another preferred form of the invention, L in Formula (I) is an alkylene group selected from —CF(CF$_3$)—, —CF$_2$—, —CF$_2$CF$_2$—, —CHFCF$_2$—, and —CF$_2$CHF—.

The fluorosurfactant used in accordance with the invention may be a diether if R1 or L contains ether linkages. Such compounds are made, for example, by the teachings in WO 01/46116 A1 (Hintzer et al.). Preferred fluoroether acids or salts are fluoromonoethers where R$^1$ and L do not contain ether linkages.

In accordance with another preferred form of the invention, R$^1$ in Formula (I) is a linear partially or fully fluorinated alkyl group having 2 to 3 carbon atoms. Preferably, R$^1$ is fully fluorinated.

In accordance with another preferred form of the invention, the fluorosurfactant is highly fluorinated. "Highly fluorinated" in reference to fluorosurfactant means that at least about 50% of the total number of univalent atoms bonded to carbon in the fluorosurfactant are fluorine atoms. More preferably, at least about 75% of the total number of univalent atoms bonded to carbon in the fluorosurfactant are fluorine atoms, most preferably at least about 90%. Perfluorinated surfactants are also preferred for use in accordance with the invention.

In accordance with one preferred embodiment of the invention, the fluorosurfactant is a compound of the formula:

[CF$_3$CF$_2$CF$_2$OCF(CF$_3$)COO$^-$]Y$^+$     (II)

wherein Y$^+$ is hydrogen, ammonium, or alkali metal cation. This compound is represented by Formula (I) wherein R$^1$ is CF$_3$CF$_2$CF$_2$—; L is —CF(CF$_3$)—; A$^-$ is carboxylate; and Y$^+$ is hydrogen, ammonium or alkali metal cation. Preferably, Y$^+$ is hydrogen or ammonium. A compound of this formula can be obtained from the perfluoro-2-propoxypropionyl fluoride intermediate prepared according to U.S. Pat. No. 3,291,843 or by dimerization of hexafluoropropylene oxide and subsequent hydrolysis of the resulting acid fluoride to carboxylic acid in the case of the acid and, in the case of the salt, by simultaneous or subsequent reaction with the appropriate base to produce the desired salt. A procedure for dimerization of hexafluoropropylene oxide is disclosed in G.B. Patent 1,292,268.

In accordance with another preferred embodiment of the invention, the fluorosurfactant is a compound of the formula:

[CF$_3$CF$_2$OCF(CF$_3$)COO$^-$]Y$^+$     (III)

wherein Y$^+$ is hydrogen, ammonium, or alkali metal cation. A compound of this formula can be obtained from the perfluoro-2-ethoxypropionyl fluoride intermediate prepared according to U.S. Pat. No. 3,291,843 and subsequent hydrolysis of the resulting acid fluoride to carboxylic acid in the case of the acid and, in the case of the salt, by simultaneous or subsequent reaction with the appropriate base to produce the desired salt.

In accordance with other embodiments of the invention, the fluorosurfactant is a compound of the formula:

[C$_2$F$_5$OCF$_2$CF$_2$CF$_2$COO$^-$]Y$^+$     (IV)

[C$_3$F$_7$OCF$_2$COO$^-$]Y$^+$     (V)

[C$_3$F$_7$OCF$_2$CF$_2$COO$^-$]Y$^+$     (VI)

[C$_3$F$_7$OCF$_2$CF$_2$CF$_2$COO$^-$]Y$^+$     (VII)

wherein Y$^+$ is hydrogen, ammonium, or alkali metal cation. These compounds can be made, for example, by the procedures described in U.S. Patent Publication 2007/0015864 (Hintzer et al.).

In accordance with another embodiment of the invention, the fluorosurfactant is a compound of Formula (I) wherein n is 0; R$^1$ and L collectively comprises a perfluoroalkyl group having 4-6 carbons; and A$^-$ is sulfonate and sulfonamide anion. In a preferred embodiment of this form of the invention, A$^-$ is sulfonamide anion, the sulfonamide compound of Formula (VIII) below:

[C$_4$F$_9$SO$_2$N$^-$CH$_2$CH$_2$OH]Y$^+$     (VIII)

wherein Y$^+$ is hydrogen, ammonium, or alkali metal cation. A surfactant of this formula as the ammonium salt is available commercially from 3M under the trademark NOVEC™ 4200.

In accordance with another embodiment of the invention, the fluorosurfactant is a compound of the formula:

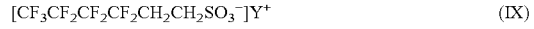
[CF$_3$CF$_2$CF$_2$CF$_2$CH$_2$CH$_2$SO$_3^-$]Y$^+$     (IX)

wherein Y$^+$ is hydrogen, ammonium, or alkali metal cation.

The surfactant can be added to the aqueous polymerization medium prior to, simultaneously with and/or subsequently to the addition of the dispersion of fluorinated ionomer particulate. In a preferred embodiment, the surfactant is supplied in salt form. If the surfactant is supplied as the corresponding acid, conversion to salt can be accomplished by adding ammonium hydroxide or alkali metal hydroxide, preferably ammonium hydroxide, to a solution of the acid in a quantity sufficient to substantially completely convert the acid to salt form prior to adding the surfactant to the aqueous polymerization medium. Alternatively the surfactant supplied in acid form can be added to the aqueous polymerization medium and subsequently converted to salt form.

Initiators

Polymerization in accordance with the invention employs free radical initiators capable of generating radicals under the conditions of polymerization. As is well known in the art, initiators for use in accordance with the invention are selected based on the type of fluoropolymer and the desired properties to be obtained, e.g., end group type, molecular weight, etc. Water-soluble salts of inorganic peracids are suitably employed which produce anionic end groups in the polymer. Preferred initiators of this type have a relatively long half-life at the temperature of polymerization, preferably persulfate salts, e.g., ammonium persulfate or potassium persulfate. To shorten the half-life of persulfate initiators, reducing agents such as ammonium bisulfite or sodium metabisulfite, with or without metal catalyst salts such as iron, can be used. Preferred persulfate initiators are substantially free of metal ions and most preferably are ammonium salts.

The initiator is added to the aqueous polymerization medium in an amount sufficient to initiate and maintain the polymerization reaction at a desired reaction rate. At least a portion of the initiator is preferably added at the beginning of the polymerization. A variety of modes of addition may be used including continuously throughout the polymerization, or in doses or intervals at predetermined times during the polymerization. A particularly preferred mode of operation is for initiator to be precharged to the reactor and additional initiator to be continuously fed into the reactor as the polymerization proceeds. Preferably, total amounts of ammonium persulfate and/or potassium persulfate employed during the course of polymerization are about 25 ppm to about 250 ppm based on the weight of the aqueous medium. Other types of initiators, for example, potassium permanganate/oxalic acid initiators, can be employed in amounts and in accordance with procedures as known in the art.

Chain Transfer Agents

Chain-transfer agents may be used in a process in accordance with the invention to decrease molecular weight for the purposes of controlling melt viscosity. Chain transfer agents useful for this purpose are well-known for use in the polymerization of fluorinated monomers. Preferred chain transfer agents include hydrogen, aliphatic hydrocarbons, halocarbons, hydrohalocarbons or alcohol having 1 to 20 carbon atoms, more preferably 1 to 8 carbon atoms. Representative preferred examples of such chain transfer agents are alkanes such as ethane, chloroform, 1,4-diiodoperfluorobutane and methanol.

The amount of a chain transfer agent and the mode of addition depend on the activity of the particular chain transfer agent and on the desired molecular weight of the polymer product. A variety of modes of addition may be used including a single addition before the start of polymerization, continuously throughout the polymerization, or in doses or intervals at predetermined times during the polymerization. The amount of chain train transfer agent supplied to the polymerization reactor is preferably about 0.005 to about 5 wt %, more preferably from about 0.01 to about 2 wt % based upon the weight of the resulting fluorinated ionomer.

Process

In the practice of a preferred embodiment of the invention, the process is carried out as a batch process in a pressured reactor. Suitable vertical or horizontal reactors for carrying out the process of the invention are equipped with stirrers for the aqueous medium to provide sufficient contact of gas phase monomers such as TFE for desirable reaction rates and uniform incorporation of comonomers if employed. The reactor preferably includes a cooling jacket surrounding the reactor so that the reaction temperature may be conveniently controlled by circulation of a controlled temperature heat exchange medium.

In a typical process, the reactor is first charged with deionized and deaerated water of the polymerization medium and the fluorinated ionomer particulate is dispersed in the medium. If used, surfactant is suitable precharged and/or fed to the reactor as the reaction proceeds. A suitable procedure for a copolymer of TFE and perfluoro(3,6-dioxa-4-methyl-7-octenesulfonate (PDMOS) monomer (either acid or salt form) includes first pressurizing the reactor with TFE. The comonomer PDMOS is then added. A free-radical initiator solution such as ammonium persulfate solution is then added. The temperature is increased and, once polymerization begins, additional TFE is added to maintain the pressure. The beginning of polymerization is referred to as kick-off and is defined as the point at which gaseous monomer feed pressure is observed to drop substantially, for example, about 5-10 psi (about 35-70 kPa). Comonomer and/or chain transfer agent can also be added as the polymerization proceeds. For some polymerizations, surfactant and/or initiator may be added during the polymerization.

Batch dispersion polymerizations can be described as proceeding in two phases. The initial period of the reaction can be said to be a nucleation phase during which a given number of particles are established. Subsequently, it can be said that a growth phase occurs in which the predominant action is polymerization of monomer on established particles with little or no formation of new particles. The transition from the nucleation to the growth phase of polymerization occurs smoothly, typically between about 4 and about 10 percent solids in the polymerization.

The use of fluorinated ionomer in accordance with the invention generally provides sufficient nucleation for the polymerization process and additional nucleating agents are not required. It is not necessary for stabilizing surfactants, if used, to provide additional nucleation although surfactants capable of effective nucleation may be used if desired. In accordance with one embodiment of the present invention, the number of dispersed fluorinated ionomer particles in the particulate introduced into the polymerization medium is preferably selected to control the number of particles formed during the nucleation phase. Preferably, the fluorinated ionomer particulate in the aqueous polymerization medium provides a number of dispersed fluorinated ionomer particles within about 15% of the number of fluoropolymer particles produced by polymerizing the fluorinated monomer. More preferably, the number of dispersed fluorinated ionomer particles is within about 10% of the number of fluoropolymer particles produced by polymerizing, more preferably, the number of dispersed fluorinated ionomer particles is within about 5% of the number of fluoropolymer particles produced by polymerizing. Most preferably, the number of dispersed fluorinated ionomer particles is approximately equal to the number of fluoropolymer particles produced by polymerizing. The amount of fluoropolymer particulate to be employed in a process in accordance with the invention may be determined by estimating the number of fluoropolymer particles to be produced in the process based on particle size and solids content and employing an amount of fluorinated ionomer particulate which provides approximately the same number of particles. If other nucleating agents are also employed in the polymerization, it may be desirable to employ a smaller number of particles of fluorinated ionomer particulate. Typical concentrations of dispersed fluorinated ionomer particulate are about $1 \times 10^{16}$ particles per liter to about $1 \times 10^{20}$ particles per liter.

Preferably, the amount of fluorinated ionomer particulate provided in the aqueous polymerization medium comprises less than about 15 weight % of the fluoropolymer solids to be produced in the process. In more preferred embodiments the amount of fluorinated ionomer particulate provided in the aqueous polymerization medium comprises less than about 10 wt %, and even more preferably less than about 1 wt %, still more preferably about 0.1 wt % of the fluoropolymer solids to be produced in the process and most preferably less than 0.025 wt % of the fluoropolymer solids.

If used, the amount of surfactant employed is dependent upon the desired solids content for the polymerization, the type of surfactant, the type of fluoropolymer being produced, reactor design, etc. The amounts employed can be similar to the amounts employed in conventional polymerizations which do not employ fluorinated ionomer particulate.

Typical amounts are about 0.01 wt % to about 1 wt % based on the weight of water in the polymerization medium. When a surfactant is used which is capable of effective nucleation, the amount employed typically will be less than the amount employed in a conventional polymerization without the use of fluorinated ionomer particulate.

The solids content of the dispersion upon completion of polymerization can be varied depending upon the intended use for the dispersion. The solids content of fluoropolymer dispersion produced by the process of the invention is preferably at least about 10 wt %. More preferably, the fluoropolymer solids content is at least about 20 wt %. A preferred range for fluoropolymer solids content produced by the process is about 20 wt % to about 65 wt %, even more preferably about 20 wt % to about 55 wt %, most preferably, about 35 wt % to about 55 wt %.

After batch completion (typically several hours) when the desired amount of polymer or solids content has been achieved, the feeds are stopped, the reactor is vented and purged with nitrogen, and the raw dispersion in the vessel is transferred to a cooling vessel. In a preferred process of the invention, polymerizing produces less than about 13 wt %, more preferably less than about 10 wt %, still more preferably less than 3 wt %, even more preferably less than 1 wt %, most preferably less that about 0.5 wt % of undispersed fluoropolymer (coagulum) based on the total weight of fluoropolymer produced.

In one embodiment of the invention, the aqueous dispersion of fluoropolymer particles has a raw dispersion particle size (RDPS) of from about 10 to about 400 nm, preferably 100 to 350 nm.

The aqueous dispersions of fluorinated ionomer particles produced in accordance with the invention typically are stable as produced but can be further stabilized with anionic, cationic, or nonionic surfactant for certain uses. The fluorinated ionomer can also be isolated from the dispersion by coagulation and removal of the aqueous medium. Sulfonate polymers in acid form can be melt-processed for some applications. For this use, the fluorinated ionomer is dried then processed into a convenient form such as flake, chip or pellet for use in subsequent melt-processing operations.

The process of the invention may also be carried out as a continuous process in a pressurized reactor.

Polymerization Products

The process of the invention directly produces fluorinated ionomer and a hydrolysis step is not required as in prior art processes. The fluorinated ionomer may be produced in acid or salt form as may be desired for end use applications. Preferably, the fluorinated ionomer of the particulate has an ion exchange ratio of about 3 to about 53. Preferably, the fluorinated ionomer is highly fluorinated, most preferably perfluorinated.

In a preferred embodiment of the invention, the fluorinated ionomer comprises a polymer backbone with recurring side chains attached to the polymer backbone with the side chains carrying ionic groups. Ionic groups are preferably selected from the group consisting of sulfonate, carboxylate, phosphonate, phosphate and mixtures thereof. Preferably, the fluorinated ionomer of the particulate comprises ionic groups having a pKa less than about 10. Sulfonate groups are most preferred.

In a preferred embodiment of the invention, the fluorinated ionomer has recurring side chains represented by the formula —(O—CF$_2$CFR$_f$)$_a$—(O—CF$_2$)$_b$—(CFR'$_f$)$_c$SO$_3$X, wherein R$_f$ and R'$_f$ are independently selected from F, Cl or a perfluorinated alkyl group having 1 to 10 carbon atoms, a=0 to 2, b=0 to 1, c=0 to 6, and X is H, Li, Na, K or NH$_4$. More preferably, the recurring side chain is represented by the formula —O—CF$_2$CF(CF$_3$)—O—CF$_2$CF$_2$—SO$_3$X wherein X is H, Li, Na, K or NH$_4$. Preferably, fluorinated ionomer produced by the process has a melt flow in thermoplastic form at 270° C. using a 5 kg weight of about 1 to about 500.

The fluorinated ionomer particles made using the process of the invention can be employed generally in the same manner as fluorinated ionomer made conventionally except that hydrolysis is not required to convert the as-polymerized polymer to ionomer. Aqueous dispersions of the fluorinated ionomer particles can be used for to produce coatings on a variety of substrates and cast to make films useful as ion exchange membranes useful in electrochemical processes and devices, for example, as membranes in the chloralkali process and in fuel cells. Melt processable fluorinated ionomer coagulated from the dispersion can be melt extruded into films for similar uses in the chloralkali process and in fuel cells. The aqueous dispersions of fluorinated ionomer particles, as well as coating and articles produced, are also useful for acid catalyst applications.

Test Methods

Melt Flow Rate (MFR) of the Fluorinated Ionomer is measured on the polymer in thermoplastic form, e.g., the sulfonyl fluoride or sulfonic acid form for sulfonate ionomers, according to the method of ASTM D-1238-04c at 270° C. with a 2110 gram weight.

Fluorinated Ionomer Particulate Size, Weight Average, is measured by dynamic light scattering (DLS). Dispersions of the ionomers were diluted from 10× to 100× (vol:vol), but typically 30×, into a dispersant of dimethyl sulfoxide with additives of 0.1 wt % (solids basis) of Zonyl® 1033D (C$_6$F$_{13}$CH$_2$CH$_2$SO$_3$H) surfactant and 0.23 wt % ethyldiisopropylamine, which neutralized the Zonyl® and the ionomer end groups to trialklyammonium forms. This dispersant mixture was called "DMSOZE". The diluted dispersion was filtered through a 1.0 um graded density glass micro fiber syringe filter (Whatman PURADISC® #6783-2510) into a disposable polystyrene cuvette. Dynamic light scattering (DLS) was measured at 25° C. using a Malvern Instruments Nano S, which measures scattered light from a HeNe laser at 633 nm at a scattered angle of 173° (close to backscattered). The automated instrument chooses how many 10 s runs make up each measurement (generally 12 to 16), and for each sample ten measurements were performed, the entire process taking usually ~30 min. For concentrated or highly scattering samples, the instrument may move the focal point of the laser close to the front of the cuvette, minimizing the path length through the sample and thus reducing particle-particle scattering artifacts. However, for almost all the fluorinated ionomer dispersion samples analyzed here, the instrument chose to use a focal position of 4.65 mm, which maximized the path in the cell and enhanced detection of the weak scattering. In addition, the instrument adjusts an attenuator to maintain the count rate in an optimum range. The attenuator settings were 11, 10, or 9, which correspond to light attenuation factors of ×1.00 (no attenuation), ×0.291, or ×0.115, respectively. Various numeric and graphical outputs are available from the Malvern software. The simplest and most robust is the "z-average" particle diameter, calculated from the z-average diffusion coefficient made by a cumulants fit to the autocorrelation function. The name z-average has been used in analogy to the z-average molecular weight Mz, in that the DLS z-average particle size is derived from a distribution of diffusion coefficients weighted by the square of the particle mass $M_i^2$. Half of the scattered light Intensity is produced by particles with diameters larger than D(I)50. Using the input refractive index of the particles, dispersant index, wavelength, and scattering angle, the software uses a Mie calculation to convert the intensity distribution to a weight distribution. The weight average diameter is that diameter at which half of the mass of the particles in the sample have a larger diameter and half have a smaller diameter.

Dry coagulum amount is measured by physically collecting the wet polymer that coagulates during the course of the polymerization and then drying this coagulum overnight at 80° C. and a vacuum of 30 mm Hg (4 kPa). The dried coagulum is weighed and the Weight Percentage of Undispersed Polymer (Coaq. wt %) is determined based on the total weight of fluoropolymer in the dispersion.

Transition Temperatures of Fluoropolymers by Differential Scanning Calorimetry (DSC) is measured according to ASTM D 3418-03.

Comonomer Content is measured by FTIR according to the method disclosed in U.S. Pat. No. 4,743,658, col. 5, lines 9-23.

Fluorinated Ionomer Particle Size, i.e., raw dispersion particle size (RDPS) of the fluorinated ionomer produced in the process is determined by laser diffraction techniques that measure the particle size distributions (PSD) of materials using a Microtrac Ultrafine Particle Analyzer (UPA). The UPA uses dynamic light scattering principle for measuring PSD with size range of 0.003 micron to 6.54 micron. The samples were analyzed after collecting the background with water. The measurements were repeated three times and averaged.

Perfluoroalkane Carboxylic Acid or Salt Fluorosurfactant Content is measured by a GC technique in which the fluorosurfactant is esterified with acidic methanol. Perfluoroheptanoic acid is used as an internal standard. Upon addition of electrolyte and hexane the ester is extracted into the upper hexane layer. The hexane layer is analyzed by injection onto a glass GC column of 20 ft.×2 mm I.D. packed with 10% OV-210 on 70/80 mech Chromosorb W.AW.DMCS. held at 120 C. The detector is ECD and the carrier gas of 95% argon/5% methane has a flow rate of 20 to 30 ml/min.

EXAMPLE

Fluorinated Ionomer Particulate

Aqueous dispersion of fluorinated ionomer particulate (FI) is prepared according to the procedure described as Example 4 in U.S. Pat. No. 7,166,685, (fluorinated ionomer in the acid form) using TFE/PDMOF fluorinated ionomer resin having an IXR of 12.1 (EW of 950) and a melt flow in its sulfonyl fluoride form of 24. The aqueous dispersion of fluorinated ionomer particulate has a solids content of 21.4 wt % with the fluorinated ionomer particulate having a weight average diameter of 5.23 nm. The ionic groups have a pKa of about 1.9 as measured on the fluorinated ionomer in aqueous dispersion form having 10 wt % solids at room temperature.

Surfactant

For use in Example 1 below, the surfactant: $C_3F_7OCF(CF_3)COONH_4$ (HFPO dimer acid salt, DAS), 20 wt %, is prepared by dropwise addition of 128 g of concentrated ammonium hydroxide solution to 500 g of $C_3F_7OCF(CF_3)COOH$ and subsequent dilution with deionized water to 20 wt %.

Example 1

TFE/PDMOS Polymerization Using Dispersed Fluorinated Ionomer Particulate

This example demonstrates the polymerization of TFE/PDMOS fluorinated ionomer copolymer in the presence of dispersed particulate of fluorinated ionomer in a 1 gallon (3.8 liter) reactor.

A cylindrical, horizontal, water-jacketed, paddle-stirred, stainless steel reactor having a length to diameter ratio of about 1.5 and a water capacity of 1 gallon (3.8 liter) is charged with 1750 grams of demineralized water, 1.4 g of a dispersion of 20 wt % aqueous solution of fluorinated ionomer particulate, and 20 grams of a 20 wt % aqueous solution of DAS. With the reactor paddle agitated at 110 rpm, the reactor is heated to 25° C. and then evacuated and purged three times with tetrafluoroethylene (TFE). The reactor temperature is increased to 65° C., and is pressured to 30 psig (0.31 MPa) with TFE. Then 40 ml of freshly prepared aqueous initiator solution containing 0.5% ammonium persulfate (APS) is injected. Then, this same initiator solution is pumped into the reactor at 0.1 ml/min. After polymerization has begun as indicated by a 5 psi (35 KPa) drop in reactor pressure (kick-off), additional TFE is fed into the reactor at a rate of 0.5 gram/minute. After 5 grams of TFE have been consumed after kickoff, 100 ml of perfluoro(3,6-dioxa-4-methyl-7-octene) sulfonic acid is injected followed by 0.25 ml/min of perfluoro (3,6-dioxa-4-methyl-7-octene)sulfonic acid for the remainder of the batch. At the same time, 0.25 ml/min of the same 0.2 wt % APS solution is injected for the remainder of the batch. The TFE feed rate is adjusted to 1.13 g/minute. After 60 minutes (67.8 additional grams of TFE consumed), the reaction is terminated. At the end of the reaction period, the feeds are stopped, and the reactor is slowly vented. After venting to nearly atmospheric pressure, the reactor is purged with nitrogen to remove residual monomer. Upon further cooling, the dispersion is discharged from the reactor at below 35° C. The solids content of the raw dispersion is 7.1 wt % and the raw dispersion particle size (RDPS) is 74 nm.

The dispersion is coagulated by freezing and thawing. After coagulation, the polymer is isolated by filtering and then drying in a 150° C. convection air oven. The isolated polymer contains 48 wt % perfluoro(3,6-dioxa-4-methyl-7-octene)sulfonic acid (IXR=13.6, EW=1025) and has a melt flow rate measured by ASTM D-1238-04c at 270° C. with a 2110 gram weight of 23.4 grams/10 minutes.

What is claimed is:

1. A process for making an aqueous dispersion of fluorinated ionomer particles comprising:
providing dispersed solid particulate of fluorinated ionomer in an aqueous polymerization medium;
polymerizing at least one fluorinated monomer having an ionic group in said aqueous polymerization medium in the presence of said dispersed particulate of fluorinated ionomer and initiator to form the aqueous dispersion of particles of fluorinated ionomer.

2. The process of claim 1 wherein the amount of said dispersed particulate of fluorinated ionomer provided in said aqueous polymerization medium comprises less than 15 wt % of the solids content of said aqueous dispersion of fluorinated ionomer particles produced by said process.

3. The process of claim 1 wherein said particulate of fluorinated ionomer has a weight average particle size of about 2 nm to about 100 nm.

4. The process of claim 1 wherein said fluorinated ionomer of said particulate has an ion exchange ratio of about 3 to about 53.

5. The process of claim 1 wherein at least 90% of the total number of univalent atoms bonded to carbon atoms in said fluorinated ionomer of said particulate are fluorine atoms.

6. The process of claim 1 wherein said fluorinated ionomer of said particulate is perfluorinated.

7. The process of claim 1 wherein said fluorinated ionomer of said particulate comprises a polymer backbone with recurring side chains attached to the polymer backbone with the side chains carrying ionic groups.

8. The process of claim 1 wherein said fluorinated ionomer of said particulate comprises ionic groups having a pKa less than 10.

9. The process of claim 1 wherein said fluorinated ionomer of said particulate comprises ionic groups selected from the group consisting of sulfonate, carboxylate, phosphonate, phosphate and mixtures thereof.

10. The process of claim 1 wherein said fluorinated ionomer of said particulate comprises sulfonate groups.

11. The process of claim 7 wherein said recurring side chains are represented by the formula —(O—CF$_2$CFR$_f$)$_a$—(O—CF$_2$)$_b$—(CFR'$_f$)$_c$SO$_3$X, wherein R$_f$ and R'$_f$ are independently selected from F, Cl or a perfluorinated alkyl group having 1 to 10 carbon atoms, a=0 to 2, b=0 to 1, c=0 to 6, and X is H, Li, Na, K or NH$_4$.

12. The process of claim 11 wherein said recurring side chain is represented by the formula —O—CF$_2$CF(CF$_3$)—O—CF$_2$CF$_2$—SO$_3$X wherein X is H, Li, Na, K or NH$_4$.

13. The process of claim 1 wherein said fluorinated ionomer of said particulate in thermoplastic form has a melt flow at 270° C. using a 5 kg weight of about 1 to about 500.

14. The process of claim 1 further comprising providing surfactant in said polymerization medium.

15. The process of claim 1 further comprising providing fluorosurfactant in said polymerization medium.

16. The process of claim 1 further comprising providing fluoroether surfactant in said polymerization medium.

17. The process of claim 15 wherein said fluorosurfactant has the formula:

[R$^1$—O$_n$-L-A$^-$]Y$^+$ 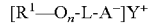

wherein:
R$^1$ is a linear or branched partially or fully fluorinated aliphatic group which may contain ether linkages;
n is 0 or 1;
L is a linear or branched alkylene group which may be nonfluorinated, partially fluorinated or fully fluorinated and which may contain ether linkages;
A$^-$ is an anionic group selected from the group consisting of carboxylate, sulfonate, sulfonamide anion, and phosphonate; and
Y$^+$ is hydrogen, ammonium or alkali metal cation;
with the proviso that the chain length of R$^1$—O$_n$-L- is not greater than 6 atoms.

18. The process of claim 17 wherein n is 1.

19. The process of claim 18 wherein
R$^1$ is CF$_3$CF$_2$CF$_2$—;
L is —CF(CF$_3$)—; and
A$^-$ is carboxylate; and
Y$^+$ is hydrogen or ammonium.

20. The process of claim 1 wherein said aqueous medium contains less than 300 ppm of perfluoroalkane carboxylic acid or salt fluorosurfactant having 8 or more carbon atoms based on the weight of water in said aqueous polymerization medium.

21. The process of claim 1 wherein said polymerizing produces less than 13 wt % undispersed fluorinated ionomer based on the total weight of fluorinated ionomer produced.

22. The process of claim 1 wherein providing said dispersed fluorinated ionomer particulate in said aqueous polymerization medium is performed by mixing concentrated aqueous liquid dispersion or dispersible powder of said fluorinated ionomer into said aqueous polymerization medium.

* * * * *